UNITED STATES PATENT OFFICE.

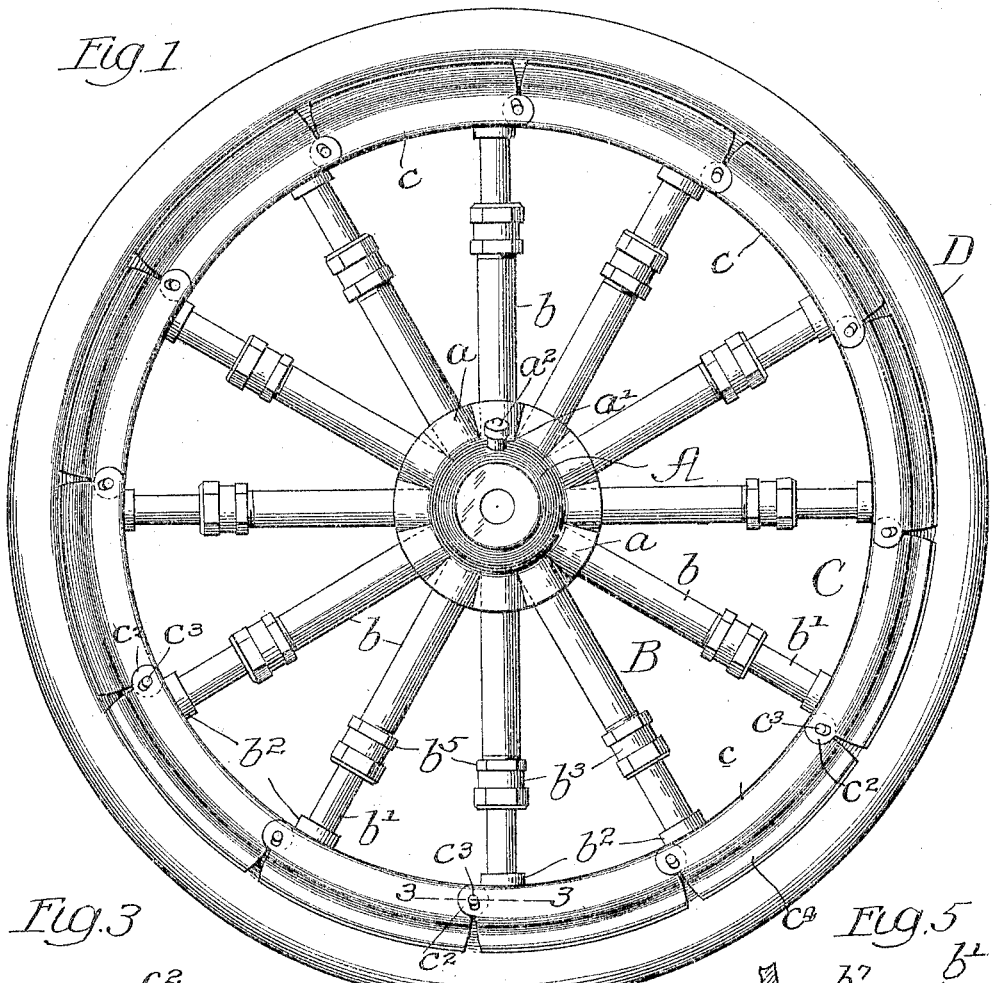
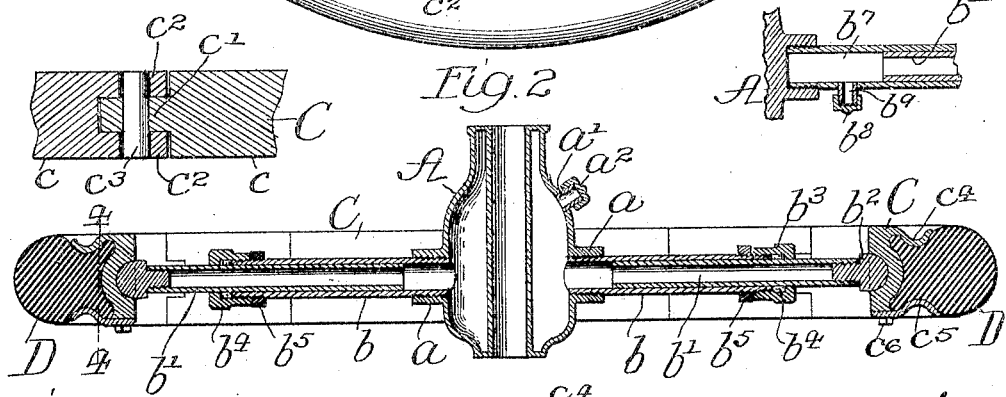

CHARLES E. HUXLEY, OF CHICAGO, ILLINOIS.

VEHICLE-WHEEL.

No. 802,643.        Specification of Letters Patent.        Patented Oct. 24, 1905.

Application filed January 6, 1905. Serial No. 239,910.

*To all whom it may concern:*

Be it known that I, CHARLES E. HUXLEY, a citizen of the United States, residing at Chicago, in the county of Cook and State of Illinois, have invented certain new and useful Improvements in Vehicle-Wheels; and I do hereby declare that the following is a full, clear, and exact description thereof, reference being had to the accompanying drawings, and to the letters of reference marked thereon, which form a part of this specification.

This invention relates to improvements in vehicle-wheels; and the object of the invention is to provide a wheel which is so constructed and arranged that the wheel itself is of a pneumatically-yielding structure, thereby avoiding the necessity of employing pneumatic tires in order to cushion or absorb the shocks or jars brought upon the wheel during the passage of the same over rough and uneven roadways.

My improved wheel, while capable of general adaptation to all kinds of vehicles, is of such construction as to lend itself with peculiar adaptability to use on motor-vehicles and is designed to take the place of the usually rigidly-constructed wheels provided with pneumatic tires.

My improved wheel embraces as its main or principal features of construction a central hub, a surrounding flexible rim, and spokes extending between and connected with the rim and hub, the spokes being so arranged and constructed as to be placed under the influence of air under compression contained partially or wholly within said tires, against the action of which body or bodies of air the flexible rim is capable of yielding toward the hub when weight is brought thereon, and thus cushions the effect of sudden shocks and jars. In order to produce this effect, the spokes are herein shown as made of telescopic construction—that is to say, each spoke consists of an inner section attached to the hub and an outer section connected with the rim, at least one of said sections being tubular to receive the other. The air under compression is confined within the hollow sections of the spokes and constitutes cushioning bodies which permit inwardly-yielding movement of the outer spoke-sections and the flexible or jointed rim. The wheel thus constructed and arranged is capable of pneumatically yielding to the shocks incident to its passage over rough roadways, and thus absorbs such shocks without the necessity of employing pneumatic or equivalent tires. The air thus contained under compression in said tubular telescopic spokes acts normally when there is no weight on the wheel to maintain the flexible rim circular, but permits said rim to yieldingly flex inwardly in use. The compression of the air is such as to maintain the wheel fairly rigid under ordinary conditions, while permitting the parts to yield upon the occasion of sudden shocks being imparted thereto.

In another aspect of the invention the wheel may be considered to comprise an inner frame, of which a hub constitutes the central part, a flexible rim, and a plurality of spoke-sections extending inwardly from the rim and entering and having sliding endwise engagement with openings in a suitable air chamber or chambers of said inner frame, the air under compression in said chamber or chambers serving to normally maintain the flexible rim circular and permitting the latter to flex in a manner to cushion the wheel, as before stated.

I have shown herein one approved embodiment of my invention; but it will be obvious from the following description that the same may be considerably varied without departing from the spirit of my invention.

As shown in the drawings, Figure 1 is a side view of a vehicle-wheel made in accordance with my invention. Fig. 2 is an axial section thereof. Fig. 3 is a detail section taken on line 3 3 of Fig. 1. Fig. 4 is a detail section taken on line 4 4 of Fig. 2. Fig. 5 is a fragmentary detail showing a modification.

As shown in the drawings, A designates the hub of the wheel; B, the spokes; C, the rim, and D the tire. As shown in Figs. 1 and 2, the hub A is formed with a hollow closed chamber and is provided with a central bore to receive a bearing sleeve or skein. Each spoke consists, as shown in said Figs. 1 and 2, of two tubular sections $b\ b'$. The sections $b$ of the spokes are rigid with the hub, being herein shown as having screw-threaded engagement at their inner ends, with suitable nipples $a$, extending radially from the hub, and said sections $b$ are in free communication with the interior of the hollow hub. The outer sections $b'$ of the spokes fit within and have telescopic engagement with said inner sections $b$. The outer ends of said sections $b'$ of the spokes are provided with rounded heads $b^2$, adapted to engage spherical sockets on the inner face of the rim, thus constituting a ball-and-socket joint between said parts. Suitable stuffing-boxes surround the telescopic spoke-sections and are constructed to prevent the escape of air from the outer ends of the inner sections around the outer sections. Said stuffing-boxes consist in the present instance of suitable hollow nuts $b^3$, which have screw-threaded engagement with the outer ends of the inner sections of the spokes and are formed outside of the ends of the said inner sections to constitute chambers to receive packings $b^4$, which are compressed between said nuts and the exterior surfaces of the outer spoke-sections. Locking nuts or rings $b^5$ engage the inner ends of said stuffing-box nuts $b^3$ to lock the same in place.

The rim C is made flexible to permit it to yieldingly flex under the effect of jars and shocks brought on the wheel when passing over rough roadways. As herein shown, said rim consists of a plurality of short curved rigid sections $c$, one connected with each spoke, and said sections are suitably jointed to constitute a circular rim. The manner of jointing or hinging said sections consists in providing one end of each rim-section with a central lug $c'$, Fig. 3, adapted to enter a notch formed between two laterally-separated lugs $c^2$ on the adjacent end of an adjoining section, and said parts are connected together by means of suitable pins $c^3$. Said pins $c^3$ may be held in place in any suitable manner—as, for instance, by being pressed tightly in the apertures of the central lugs $c'$ and adapted to fit loosely in the apertures of the outer lugs $c^2$. Said apertures of the outer lugs are shown as elongated in the proper direction to permit the relative hinge movement of one rim-section to the others, and thus enable the rim as a whole to suitably flex. Said rim-sections are provided with side tire-retaining flanges $c^4$ $c^5$, which are formed to provide an undercut groove to receive and hold the tire. One of the flanges of each section—the flange $c^5$ as herein shown—is made removable, so that when all of such flanges of the rim are removed the tire may be readily inserted in place or removed therefrom, and when said flanges are fixed in place, as by means of the set-screws $c^6$, Fig. 2, the tire is held firmly in place. The side flanges $c^4$ $c^5$ of adjoining sections of the rim are separated by spaces at their adjacent ends sufficient to permit the rim to flex in the manner stated. The lugs $c'$ $c^2$ are also for this purpose rounded at their ends, as shown in Fig. 1. Said tire is herein shown as made of solid rubber, and such form of tire is preferred, inasmuch as it is a noiseless tire and because also it is to an extent a cushioning-tire.

In the construction described the hollow hub and inner tubular sections $b$ of the spokes constitute an air-chamber, which is adapted to contain air under pressure, and when so arranged the hub is provided with an air-filling tube or nipple $a'$, closed by a cap $a^2$. The said central air-chamber of the wheel before referred to comprises, therefore, in the present instance the hub and the radiating inner spoke-sections $b$; but it will be obvious that so far as the essential operation of the device is concerned the parts of the air-chamber in which the outer spoke-sections fit and slide may be otherwise made. The construction shown is preferred, however, inasmuch as said inner spoke-sections constitute desirably long guides for the outer spoke-sections, whereby is given to each spoke as a whole great rigidity. In the construction shown it is desirable that the outer spoke-sections $b'$ be made tubular, inasmuch as such construction increases the capacity of a pneumatic air-chamber. In some instances, however, the telescopic section of each spoke which enters its companion section need not be made tubular.

Instead of making the hub hollow and constituting the same part of the central air-chamber to receive the body of cushioning air under pressure the inner ends of the spokes may be closed, as shown in Fig. 5, wherein $b^7$ designates one of the inner spoke-sections, which is attached to the hub in any suitable manner, but does not communicate with an air-chamber of the hub. In the latter construction there are as many separate air-chambers as there are spokes, and each separate chamber of the spokes is filled through a suitable spoke air tube or nipple $b^9$, closed by a cap $b^8$. In this event each spoke will be separately filled with a body of air under compression. When the tubular spoke-sections are thus separately filled, it is obvious that it is of no consequence whether the outer or inner sections of each spoke be provided with a filling tube or nipple $b^9$.

The jointed sections of the rim are connected together in the manner described before the spokes are projected outwardly by the force of the body of compressed air in the central air chamber or chambers, and when air is forced under compression into said air chamber or chambers the force of compression acts to hold the spokes outwardly and to normally maintain the rim circular and the wheel sufficiently rigid to maintain its shape under normal conditions. The tire D may be placed upon the rim either before or after air under compression is introduced into the central air-chamber, said tire being of such size that when the wheel is expanded it fits closely in the annular seat formed in the rim of the tire, as described.

Changes may be made in the construction of the wheel other than those hereinbefore referred to, and I do not wish to be limited to the structural details shown except as hereinafter made the subject of specific claims.

I claim as my invention—

1. A vehicle-wheel comprising a hub, a surrounding flexible rim composed of a plurality of curved jointed sections formed to provide on their outer sides an angular seat for a tire, and pneumatic means connecting the rim with the hub constructed to normally maintain the rim circular while permitting said rim to yieldingly flex inwardly.

2. A vehicle-wheel comprising a hub, a surrounding flexible rim composed of a plurality of curved jointed sections, and spokes extending from the hub to the rim, said spokes being connected to said jointed rim-sections out of line with the joints by which the sections are connected together and constructed to permit the parts of the rim to flex radially inwardly, and pneumatic means for maintaining the rim circular while permitting it to flex inwardly.

3. A vehicle-wheel comprising a hub, a surrounding rim and spokes extending from said hub to the rim, said rim being made of a plurality of jointed sections and the spokes having ball-and-socket connection with said jointed sections of the rim, said spokes each being made of two sections, one of which is tubular and receives the other, and means for admitting air under pressure to said tubular spokes to hold the same extended and the rim circular.

4. A vehicle-wheel comprising a hub, a surrounding rim comprising a plurality of jointed sections and formed to provide a seat for a tire, and spokes extending from the hub to the rim, each spoke comprising a section connected with the hub and a section connected with the rim, one of which is tubular and receives the other, and means whereby a body of air under pressure may be introduced in said tubular section.

5. A vehicle-wheel comprising a hub, a surrounding flexible rim having circumferentially-separated, defined joints of flexure, and spokes extending from the hub to the rim, each of said spokes being made of two sections, one attached to the hub and the other to the rim, at least one of said spoke-sections being made tubular to receive the other, means for admitting air under pressure to said tubular sections, and stuffing-boxes for preventing the escape of air from said tubular spoke-sections.

6. A vehicle-wheel comprising a hollow hub, a surrounding flexible rim having circumferentially-separated, defined points of flexure and formed to provide an annular tire-seat, and spokes extending from the rim to the hub, each spoke being made of two sections, one attached to the rim and the other to the hub and communicating with the interior thereof, the inner spoke-sections being made tubular and receiving the outer spoke-sections, and means for admitting air under pressure to the hollow hub.

7. A vehicle-wheel comprising a hub, a surrounding rim comprising a plurality of short curved sections hinged together at their adjacent ends to constitute a circular rim, and spokes connected each at its outer end with one section of the rim and at its inner end with the hub, each of said spokes comprising two telescopic sections, at least one of which is tubular, and means for admitting air under pressure to said tubular spoke-sections.

8. A vehicle-wheel comprising a hollow hub, a surrounding flexible rim, and spokes extending from the hub to the rim, the rim comprising a plurality of short curved sections hinged or jointed together, the spokes comprising inner sections attached to and communicating with the interior of the hub, and outer sections loosely connected with the rim-sections out of line with their jointed connections with each other, and having telescopic connection with said inner spoke-sections, and means for admitting air under pressure to the hollow hub.

9. A vehicle-wheel comprising a hub, a surrounding rim composed of a plurality of curved jointed sections, which, in their normal condition, constitute a circular rim, and spokes connected at their inner ends with the hub, and each connected at its outer end with one of the jointed sections of the rim at a point out of line with the joint of said section with its companion section, said spokes being made longitudinally extensible and collapsible, and pneumatic means for holding said spokes extended and the rim circular.

In testimony that I claim the foregoing as my invention I affix my signature, in presence of two witnesses, this 30th day of December, A. D. 1904.

CHARLES E. HUXLEY.

Witnesses:
W. L. HALL,
GEORGE P. WILKINS.